(12) United States Patent
Zhang et al.

(10) Patent No.: US 9,886,763 B2
(45) Date of Patent: Feb. 6, 2018

(54) VISUAL NAVIGATION METHOD, VISUAL NAVIGATION DEVICE AND ROBOT

(71) Applicant: CHINA ACADEMY OF TELECOMMUNICATIONS TECHNOLOGY, Beijing (CN)

(72) Inventors: Rumin Zhang, Beijing (CN); Dijun Liu, Beijing (CN); Guobin Su, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 0 days.

(21) Appl. No.: 15/113,815

(22) PCT Filed: Feb. 6, 2015

(86) PCT No.: PCT/CN2015/072416
§ 371 (c)(1),
(2) Date: Jul. 22, 2016

(87) PCT Pub. No.: WO2015/124066
PCT Pub. Date: Aug. 27, 2015

(65) Prior Publication Data
US 2016/0335775 A1    Nov. 17, 2016

(30) Foreign Application Priority Data
Feb. 24, 2014 (CN) .......................... 2014 1 0062704

(51) Int. Cl.
*G06K 9/00* (2006.01)
*G06T 7/00* (2017.01)
(Continued)

(52) U.S. Cl.
CPC ........ *G06T 7/0065* (2013.01); *G06K 9/00664* (2013.01); *G06K 9/209* (2013.01);
(Continued)

(58) Field of Classification Search
CPC .. G06K 9/209; G06K 9/00664; G06K 9/6211; G06T 7/557; G06T 2207/10052; Y10S 901/01
See application file for complete search history.

(56) References Cited

U.S. PATENT DOCUMENTS 5,361,127 A * 11/1994 Daily .................... G01C 11/06
   348/139
6,791,540 B1 * 9/2004 Baumberg .............. G06T 15/10
   345/419
(Continued)

FOREIGN PATENT DOCUMENTS

CN    1959341    5/2007
CN    102538763    7/2012
(Continued)

OTHER PUBLICATIONS

International Search Report for PCT/CN2015/072416 dated Mar. 27, 2015 and its English translation provided by WIPO.
(Continued)

*Primary Examiner* — Aaron W Carter
(74) *Attorney, Agent, or Firm* — Ladas & Parry, LLP

(57) ABSTRACT

The present disclosure provides a visual navigation method and a visual navigation device. The method may include steps of: obtaining a plurality of ambient sub-images for a collected ambient image based on the collected ambient image; performing a region-matching process on each of the ambient sub-images to determine a disparity between at least two of the ambient sub-images; and determining coordinates of an object in the ambient image based on the determined disparity, and performing a navigation based on the determined coordinates. In the present disclosure, the ambient image is collected by a single camera, the plurality of ambient sub-images is obtained by the micro-lens array based on the collected ambient image, and then stereo
(Continued)

matching and three-dimensional (3D) reconstruction are implemented based on the ambient sub-images to perform the visual navigation. In addition, since the ambient image is collected by the single camera, the amount of the data being gathered is smaller, the processing speed is easy to be controlled, and thus it is good in real-time processing. Furthermore, depth information of an object may be determined in a more accurate manner based on information on a vertical disparity and information on a horizontal disparity of the object that may be obtained simultaneously, so that an accuracy of the navigation is effectively improved.

9 Claims, 5 Drawing Sheets

(51) Int. Cl.
    *G06K 9/40* (2006.01)
    *G06K 9/62* (2006.01)
    *G06T 7/557* (2017.01)
    *G06K 9/20* (2006.01)

(52) U.S. Cl.
    CPC .............. *G06K 9/40* (2013.01); *G06K 9/6211* (2013.01); *G06T 7/557* (2017.01); *G06T 2207/10016* (2013.01); *G06T 2207/20021* (2013.01); *Y10S 901/01* (2013.01); *Y10S 901/47* (2013.01)

(56) References Cited

U.S. PATENT DOCUMENTS

| | | | |
|---|---|---|---|
| 2005/0261849 A1 | 11/2005 | Kochi et al. | |
| 2011/0128412 A1* | 6/2011 | Milnes | G02B 27/22 348/231.99 |
| 2012/0113227 A1 | 5/2012 | Paik et al. | |
| 2012/0185094 A1* | 7/2012 | Rosenstein | B25J 11/009 700/259 |
| 2012/0242855 A1 | 9/2012 | Nagasaka et al. | |
| 2013/0070962 A1* | 3/2013 | Yankun | G06T 7/20 382/103 |
| 2013/0113881 A1* | 5/2013 | Barnum | H04N 13/0018 348/43 |
| 2013/0120605 A1* | 5/2013 | Georgiev | G06T 15/205 348/222.1 |
| 2013/0121602 A1* | 5/2013 | Azukizawa | G06T 9/001 382/233 |
| 2013/0162779 A1* | 6/2013 | Yamamoto | H04N 13/02 348/46 |
| 2013/0226344 A1* | 8/2013 | Wong | G05D 1/024 700/258 |
| 2013/0250167 A1* | 9/2013 | Nagasaka | G02B 3/0037 348/360 |
| 2014/0003732 A1* | 1/2014 | Le Floch | G06T 9/007 382/233 |
| 2014/0147032 A1* | 5/2014 | Yous | G06T 7/246 382/154 |
| 2014/0184800 A1* | 7/2014 | Hirai | G01N 21/958 348/148 |
| 2014/0204183 A1* | 7/2014 | Lee | H04N 13/0232 348/49 |
| 2014/0219549 A1* | 8/2014 | Choi | G06T 7/593 382/154 |
| 2014/0301463 A1* | 10/2014 | Rusanovskyy | H04N 19/52 375/240.14 |
| 2014/0350839 A1* | 11/2014 | Pack | G01C 21/30 701/409 |
| 2015/0036888 A1* | 2/2015 | Weisenburger | G06T 7/80 382/107 |
| 2015/0254531 A1* | 9/2015 | C.R. | G06K 9/00805 382/103 |
| 2015/0268451 A1* | 9/2015 | Wu | G02B 13/0015 348/46 |
| 2015/0271470 A1* | 9/2015 | Wu | H04N 5/225 348/49 |
| 2015/0286340 A1* | 10/2015 | Send | G01S 17/46 345/175 |
| 2015/0294472 A1* | 10/2015 | Putraya | G06T 7/0055 382/154 |
| 2015/0324659 A1* | 11/2015 | Liu | G06T 7/593 382/197 |
| 2015/0338204 A1* | 11/2015 | Richert | G06T 7/593 348/135 |
| 2015/0339824 A1* | 11/2015 | Uliyar | G06T 7/0055 348/46 |
| 2016/0191890 A1* | 6/2016 | Kawano | H04N 13/0025 382/154 |
| 2016/0210776 A1* | 7/2016 | Wanner | G06T 15/205 |
| 2016/0335775 A1* | 11/2016 | Zhang | G06T 7/0065 |
| 2016/0337632 A1* | 11/2016 | Vandame | G02B 27/58 |
| 2016/0353026 A1* | 12/2016 | Blonde | G06T 7/0002 |
| 2016/0371842 A1* | 12/2016 | Vandame | G06K 9/4604 |
| 2017/0048513 A1* | 2/2017 | Vandame | G02B 3/0056 |
| 2017/0180702 A1* | 6/2017 | Boisson | H04N 13/0271 |

FOREIGN PATENT DOCUMENTS

| | | |
|---|---|---|
| CN | 102694972 | 9/2012 |
| CN | 103188430 | 7/2013 |
| CN | 103327230 | 9/2013 |
| CN | 103411589 | 11/2013 |
| JP | 2012027000 | 2/2012 |

OTHER PUBLICATIONS

Written Opinion of the International Search Authority for PCT/CN2015/072416 dated Mar. 27, 2015 and its English translation provided by Google Translate.

Written Opinion of the International Search Authority for PCT/CN2015/072416 dated Mar. 27, 2015 and its English translation provided by WIPO.

From CN201410062704.1, Office Action dated Sep. 9, 2016 and its machine English translation.

From CN201410062704.1, Office Action dated Apr. 24, 2017 and its machine English translation.

\* cited by examiner

VISUAL NAVIGATION METHOD, VISUAL NAVIGATION DEVICE AND ROBOT

CROSS-REFERENCE TO RELATED APPLICATION

The present-application is the U.S. national phase of PCT Application No. PCT/CN2015/072416 filed on Feb. 6, 2015, which claims the priority of Chinese patent application No. 201410062704.1 filed on Feb. 24, 2014 and entitled "visual navigation method, visual navigation device and robot", the disclosures of which are incorporated herein by reference in their entireties.

TECHNICAL FIELD

The present disclosure relates to the technical field of visual positioning and navigation, in particular to a visual navigation method, a visual navigation device and a robot.

BACKGROUND

A conventional positioning system for a robot includes a Global Positioning System (GPS), an Inertial Navigation System (INS) or etc. The GPS has advantages of wide usage range and high accuracy, but is mostly affected by environment. The INS is capable of being independently in operation and has high frequency, but is mostly affected by noise signals. In recent years, one of most common methods for navigating the robot is to combine the GPS and INS, which may effectively use their respective advantages and complement each other. However, in practical implementation, a GPS signal may be prevented from being received by an obstruction in many cases, so that a positioning accuracy of the whole system is significantly reduced.

Therefore, people are looking for reliable positioning methods to take the place of the GPS, one of which is the visual navigation method. In such method, a movement of a vehicle is estimated by determining positions of the vehicle in a three-dimensional (3D) space based on matching of characteristic points in neighboring image frames, which overcomes the defects in the conventional positioning method and gains more and more attention as an effective complement of the conventional positioning method. Meanwhile, the visual navigation method is also required to be improved.

The conventional visual navigation method is implemented based on a binocular stereo camera and is of a high positioning accuracy. However, such method has disadvantages such as being difficult to be calibrated and suppress an error. Furthermore, since the binocular stereo camera has two lenses for capturing images, an amount of data being gathered is larger than before, and a processing speed is hard to be controlled, so that such method is poor in real-time processing.

As a result, it is desired to propose a visual navigation method or device which is good in real-time processing, easy to be controlled and of high accuracy, so as to meet higher demand in the field.

SUMMARY

An object of the present disclosure is to provide a visual navigation method, a visual navigation device and a robot. In one aspect, the present disclosure provides in some embodiments a visual navigation method.

The method includes steps of: obtaining a plurality of ambient sub-images for a collected ambient image based on the collected ambient image; performing a region-matching process on each of the ambient sub-images to determine a disparity between at least two of the ambient sub-images; and determining coordinates of an object in the ambient image based on the determined disparity, and performing a navigation based on the determined coordinates.

Alternatively, the step of obtaining a plurality of ambient sub-images for a collected ambient image based on the collected ambient image includes steps of: collecting the ambient image by a single camera, and obtaining the plurality of ambient sub-images by a micro-lens array included in a primary lens of the camera.

Alternatively, before the step of performing a region-matching process on each of the ambient sub-images, the method further includes a step of: pre-processing each of the ambient sub-images to eliminate noise signal in the respective ambient sub-images.

Alternatively, the step of pre-processing each of the ambient sub-images includes steps of: performing a space-domain-based denoising process on the ambient sub-images and/or performing a frequency-domain-based denoising process on the ambient sub-images.

Alternatively, the at least two of the ambient sub-images include ambient sub-images collected by at least two neighboring micro-lenses included in the micro-lens array.

Alternatively, the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction.

Alternatively, the region-matching process includes a cost matching computation and/or a cost matching aggregation.

In another aspect, the present disclosure provides in some embodiments a visual navigation device.

The visual navigation device includes: an image collection module that obtains a plurality of ambient sub-images for a collected ambient image based on the collected ambient image; a disparity determination module that determines a disparity between at least two of the ambient sub-images by performing a region-matching process on each of the ambient sub-images; and a visual navigation module that determines coordinates of an object in the ambient image based on the determined disparity, and performs a navigation based on the determined coordinates.

Alternatively, the image collection module includes a single camera, and a micro-lens array is arranged in a primary lens of the camera.

Alternatively, the visual navigation device further includes: an image processing module that pre-processes each of the ambient sub-images to eliminate noise signal in the respective ambient sub-images before performing a region-matching process on each of the ambient sub-images.

Alternatively, in the case that the image processing module pre-processes each of the ambient sub-images to eliminate noise signal in the respective ambient sub-image, the image processing module may perform a space-domain-based denoising process on the ambient sub-images and/or a frequency-domain-based denoising process on the ambient sub-images.

Alternatively, the at least two of the ambient sub-images include ambient sub-images collected by at least two neighboring micro-lenses included in the micro-lens array.

Alternatively, the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction.

Alternatively, the region-matching process includes a cost matching computation and/or a cost matching aggregation.

In yet another aspect, the present disclosure provides in some embodiments a robot including the above visual navigation device.

In the present disclosure, the ambient image is collected by a single camera, the plurality of ambient sub-images is obtained by the micro-lens array based on the collected ambient image, and then stereo matching and three-dimensional reconstruction are implemented based on the ambient sub-images to perform the visual navigation. In addition, since the ambient image is collected by the single camera, the amount of the data being gathered is smaller than before, the processing speed is easy to be controlled, and thus it is good in real-time processing. Furthermore, it is prevented from calibrating among the plurality of cameras and reduces high cost. Besides, depth information of an object may be determined in a more accurate manner based on information on a vertical disparity and information on a horizontal disparity of the object that may be obtained simultaneously, so that an accuracy of the navigation is effectively improved.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

Figure 1:
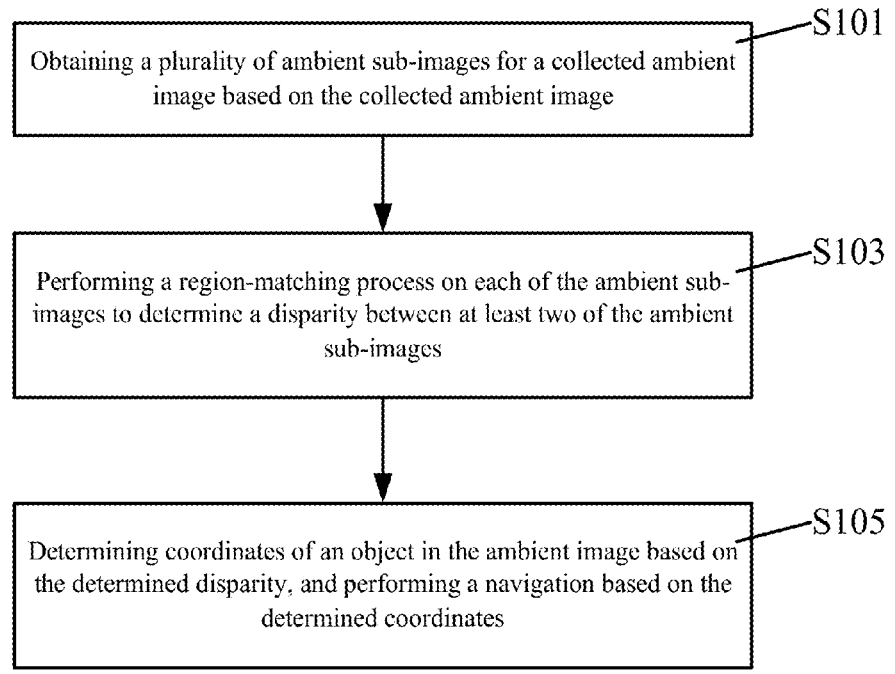
FIG. 1 is a flow chart showing a visual navigation method according to an embodiment of the present disclosure.

Hereafter, the embodiments of the present disclosure will be described in association with drawings. It should be noted that not all features for implementing the solutions of the present disclosure are fully described for clarity and conciseness. However, many determinations specific to an embodiment has to be made during a procedure of developing the embodiment, so that a developer may achieve his/her specific object. For example, the determinations relate to restrictions associated with a system and a service, and these restrictions may vary depending on different embodiment. In addition, although developing work may be complicated and time consuming, such developing work may be just a routine task for a person skilled in the art.

Furthermore, merely structures and/or steps closely related to the solutions of the present disclosure are shown in the drawings where unnecessary details are omitted, so as to not obscure a principle of the present disclosure.

In one aspect, the present disclosure provides in some embodiments a visual navigation method.

As shown in FIG. 1, the visual navigation method includes steps of:

step 101: obtaining a plurality of ambient sub-images for a collected ambient image based on the collected ambient image;

step 103: performing a region-matching process on each of the ambient sub-images to determine a disparity between at least two of the ambient sub-images; and step 105: determining coordinates of an object in the ambient image based on the determined disparity, and performing a navigation based on the determined coordinates.

Alternatively, the step of obtaining a plurality of ambient sub-images for a collected ambient image based on the collected ambient image includes steps of: collecting the ambient image by a single camera, and obtaining the plurality of ambient sub-images by a micro-lens array included in a primary lens of the camera.

Alternatively, before the step of performing a region-matching process on each of the ambient sub-images, the method further includes a step of: pre-processing each of the ambient sub-images to eliminate noise signal in the respective ambient sub-images.

Alternatively, the step of pre-processing each of the ambient sub-images includes steps of: performing a space-domain-based denoising process on the ambient sub-images and/or performing a frequency-domain-based denoising process on the ambient sub-images.

Alternatively, the at least two of the ambient sub-images include ambient sub-images collected by at least two neighboring micro-lenses included in the micro-lens array.

Alternatively, the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction.

Alternatively, the region-matching process includes a cost matching computation and/or a cost matching aggregation (summarization).

In another aspect, the present disclosure provides in some embodiments a visual navigation device.

Figure 2:
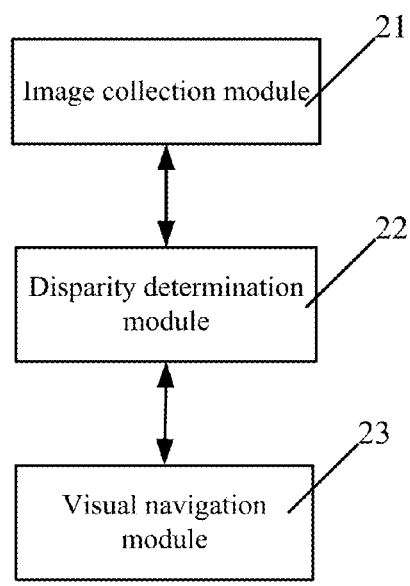
FIG. 2 is a schematic view showing a visual navigation device according to an embodiment of the present disclosure.

As shown in FIG. 2, the visual navigation device includes:

an image collection module 21 that obtains a plurality of ambient sub-images for a collected ambient image based on the collected ambient image;

a disparity determination module 22 that determines a disparity between at least two of the ambient sub-images by performing a region-matching process on each of the ambient sub-images; and a visual navigation module 23 that determines coordinates of an object in the ambient image based on the determined disparity, and performs a navigation based on the determined coordinates.

Alternatively, the image collection module 21 includes a single camera, and a micro-lens array is arranged in a primary lens of the camera.

Alternatively, the visual navigation device further includes: an image processing module (not shown) that pre-processes each of the ambient sub-images to eliminate noise signal in the respective ambient sub-images before performing a region-matching process on each of the ambient sub-images.

Alternatively, in the case that the image processing module pre-processes each of the ambient sub-images to eliminate noise signal in the respective ambient sub-images, the image processing module (not shown) may perform a space-domain-based denoising process on the ambient sub-images and/or a frequency-domain-based denoising process on the ambient sub-images.

Alternatively, the at least two of the ambient sub-images include ambient sub-images collected by at least two neighboring micro-lenses included in the micro-lens array.

Alternatively, the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction.

Alternatively, the region-matching process includes a cost matching computation and/or a cost matching aggregation.

In yet another aspect, the present disclosure provides in some embodiments a robot including the above visual navigation device.

Figure 3:
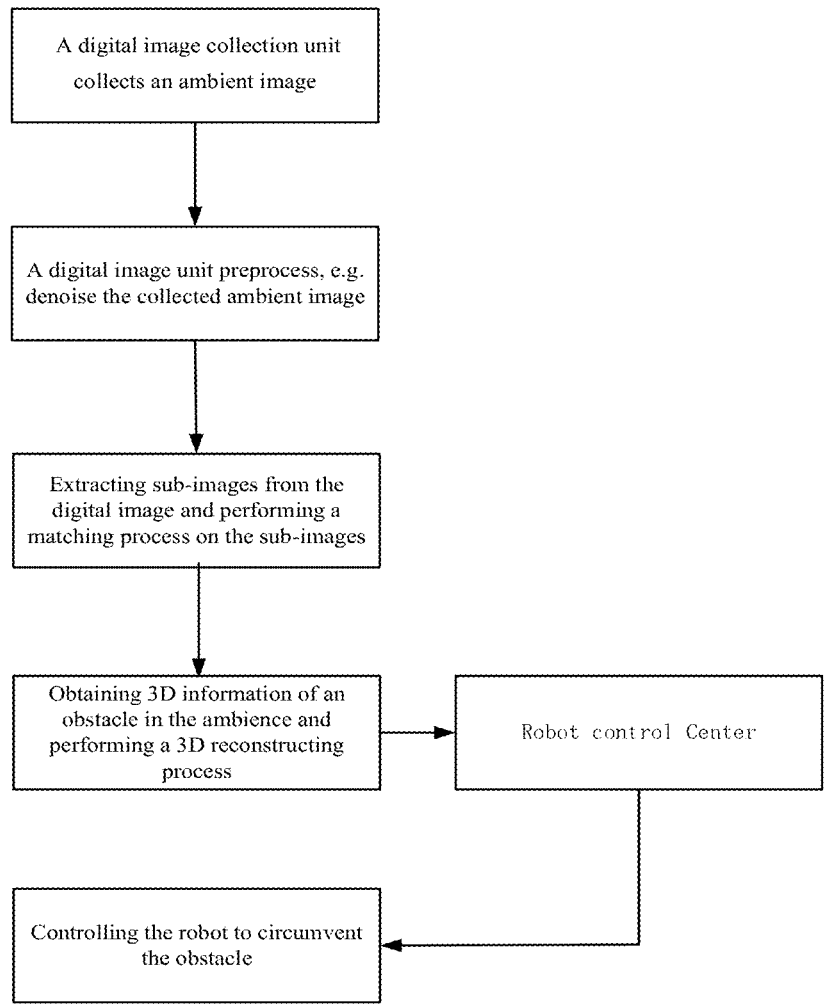
FIG. 3 is a flow chart showing a visual navigation of a robot according to an embodiment of the present disclosure.

As shown in FIG. 3, in practical implementation, a procedure of the visual navigation for the robot may be as follows. Firstly a digital image collection unit may collect an ambient image, and a digital image unit may pre-process, e.g. denoise the collected ambient image, and then extract sub-images from the digital image and perform a matching process on the sub-images, so as to obtain 3D information of an obstacle in the ambience and perform a 3D reconstructing process. A robot control center may control the robot to circumvent the obstacle based on the 3D information and the reconstructed 3D image, so as to implement the visual navigation.

Hereafter, in order to facilitate understanding of the present disclosure, the solutions thereof will be further explained in details.

In the present disclosure, a micro-lens array is arranged before a Charge-Coupled Device (CCD) sensor in the single camera, while a first imaging is implemented by a primary lens and then a second imaging is implemented by the micro-lens. As a result, a same object point may be imaged to be at different positions in respective sub-images, and then a matching process is performed on images of the same object point in neighboring sub-images to obtain corresponding depth information and 3D information of the object point. Thus, the present disclosure provides a convenient method for navigating the moving robot with low cost and high accuracy. The method will be further explained as follows.

Figure 4:
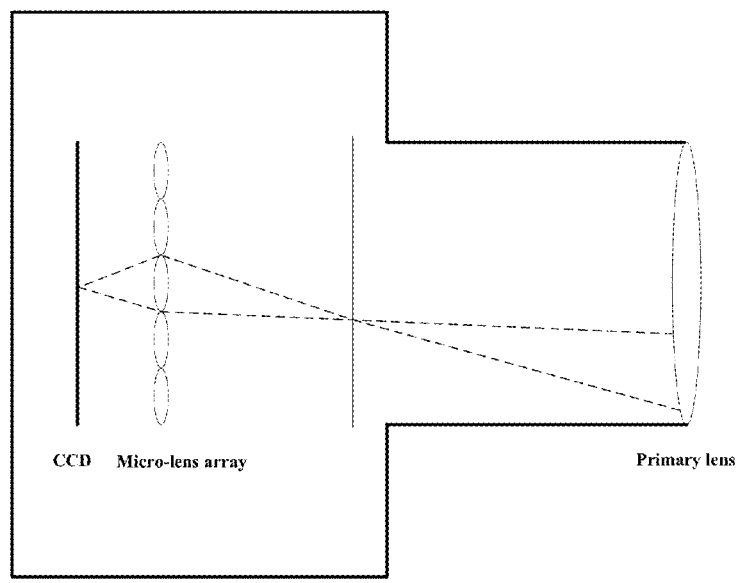
FIG. 4 is a schematic view showing a monocular camera system according to an embodiment of the present disclosure.
Figure 5:
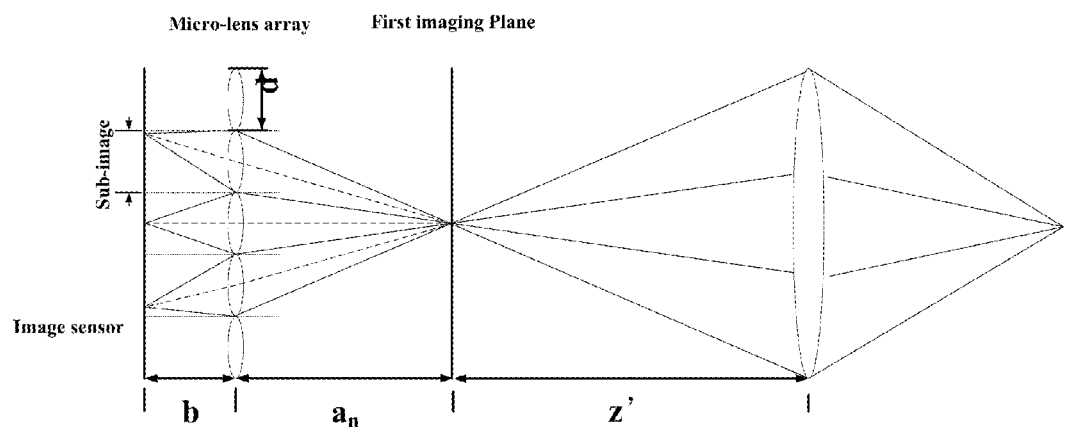
FIG. 5 is a schematic view showing imaging of an object in the monocular camera system according to an embodiment of the present disclosure.

FIG. 4 is a schematic view showing a monocular camera system according to an embodiment of the present disclosure. The monocular camera system includes a camera head, a micro-lens array and a high-resolution CCD image sensor. FIG. 5 is a schematic view showing imaging of an object in the monocular camera system according to an embodiment of the present disclosure. In the practical implementation, as shown in FIG. 5, the ambience is imaged on a first imaging plane between the primary lens and the micro-lens array by the primary lens, and then the image on the first imaging plane is imaged again on the image sensor by the micro-lens array, so as to obtain the ambient image. When the same object point is imaged on the image sensor by the plurality of micro lenses, the object point is imaged at different positions in respective sub-images which are behind micro lenses in one-to-one correspondence. Such difference is referred to as "disparity".

The robot system performs a denoising process by comparing the collected image before dividing and recognizing the collected image, so as to eliminate a noise signal and reduce a noise interference in the image. In generally, there are two methods for pre-processing the image, one of which is a space-domain-based denoising method, and the other one is a frequency-domain-based denoising method. In the following, the pre-processing of the image will be explained by taking the space-domain-based denoising method as an example.

Figure 6:
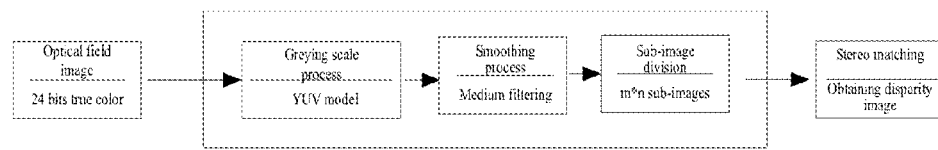
FIG. 6 is a flow chart for pre-processing an image according to an embodiment of the present disclosure.

FIG. 6 is a flow chart for pre-processing an image according to an embodiment of the present disclosure. As shown in FIG. 6, the pre-processing procedure for the image may generally include steps of: performing a greying process on the collected ambient image to convert the color image into the grey image, performing a smoothing process on the grey image, dividing the image into a plurality of sub-images and extracting the sub-images therefrom.

Figure 7:
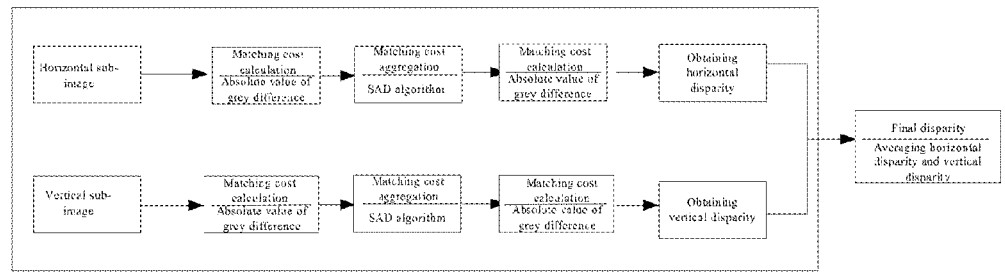
FIG. 7 is a flow chart for a stereo matching process according to an embodiment of the present disclosure.

Thereafter, the stereo matching process may be performed after the pre-processing procedure. In the case that the obstacle on a moving path of the robot in the 3D space is projected to be a two-dimensional (2D) depth image, the stereo matching process is performed to find the missed depth information z of the obstacle. Based on different primitives for the image representations in stereo matching algorithms, the stereo matching methods may be classified into three categories, i.e. a region-based matching method, a feature-based matching method and a phase-based matching method. In the following, the region-based matching method will be taken as an example. FIG. 7 is a flow chart for a stereo matching process according to an embodiment of the present disclosure. As shown in FIG. 7, in the case that the stereo matching process is performed, a matching cost for a horizontal sub-image and a matching cost for a vertical sub-image are calculated respectively. Then, the matching costs are aggregated (added), and matching cost computations are performed in turn to obtain a horizontal disparity and a vertical disparity. Finally, a general disparity may be obtained by averaging the horizontal disparity and the vertical disparity.

It should be noted that, due to the monocular camera being in use, there is only the horizontal disparity and no vertical disparity between neighboring horizontal sub-images, while there is only the vertical disparity and no horizontal disparity between neighboring vertical sub-images.

Figure 8:
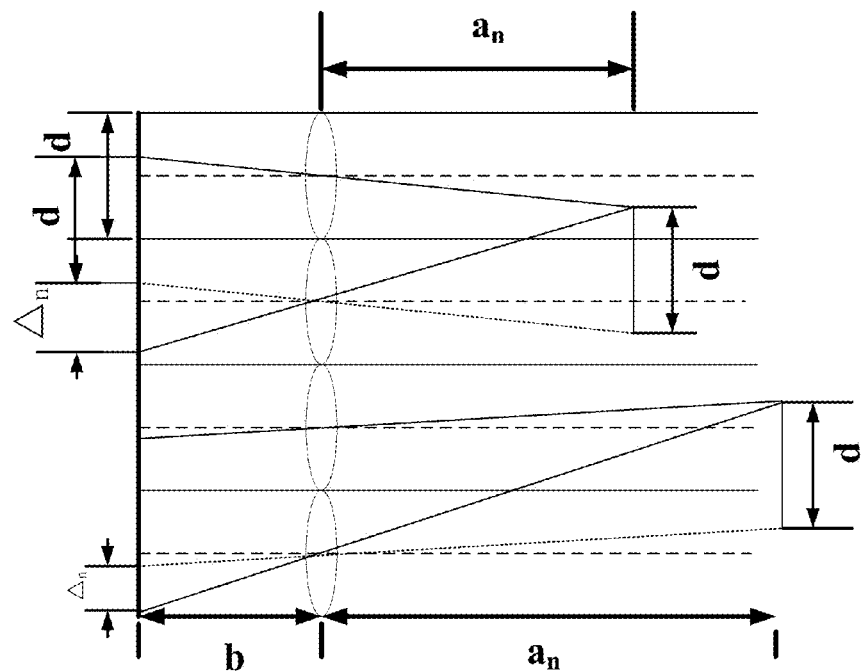
FIG. 8 is a schematic view showing disparity of optical imaging according to an embodiment of the present disclosure.

The disparity may be determined by referring to FIG. 8, which is a schematic view showing disparity of optical imaging according to an embodiment of the present disclosure. The disparity may be determined as follows. A block with a size of n*n may be selected from one of the sub-images. The block is moved smoothly on its horizontally neighboring sub-image in the horizontal direction or on its vertically neighboring sub-image in the vertical direction with a step size of a pixel. Every time a step size of a pixel is moved, a similarity between the block before the movement and the block after the movement is calculated to find a least matching error and obtain a step size value corresponding to the least matching error $\Delta_n$. In the present disclosure, the similarity may be calculated by a detection function based on an absolute value of the grey difference, and a corresponding equation may be as follows:

$$\sigma(\Delta_n) = \frac{1}{M} \sum_{i_n=1}^{i_n = m' - \Delta_n} |r_n(i_n + \Delta_n) - r_{n+1}(i_n)|$$

In the case that the value of the step size $\Delta''$ corresponding to the least matching error is obtained, the following equations may be obtained based on a principle of similar triangles:

$$\frac{d}{\Delta_n \delta} = \frac{a_n}{b}; a_n = \frac{bd}{\Delta_n \delta} = \frac{m}{\Delta_n} b$$

A distance $a_n$ between the first imaging plane of the object point and the micro lens may be calculated based on the above equations. It is assumed that a distance between the primary lens and the micro lens is v, so that a distance between the first imaging plane and the primary lens is v-$a_n$. A depth of the object point may be calculated according to an equation for imaging by the thin lens, which may be as follows:

$$\frac{1}{v - a_n} + \frac{1}{u} = \frac{1}{F}$$

A value of u, i.e. a depth value of the object point may be calculated according to the above equation. The 3D coordinates of the object may be obtained based on the depth values of the object points, so as to guide the robot to implement autonomous navigation.

In summary, in the above solutions of the present disclosure, the ambient image is collected by a single camera, the plurality of ambient sub-images is obtained by the micro-lens array based on the collected ambient image, and then stereo matching and three-dimensional reconstruction are implemented based on the ambient sub-images to perform the visual navigation. In addition, since the ambient image is collected by the single camera, the amount of the data being gathered is smaller than before, the processing speed is easy to be controlled, and thus it is good in real-time processing. Furthermore, it is prevented from calibrating among the plurality of cameras and reduces high cost. Besides, depth information of an object may be determined in a more accurate manner based on information on a vertical disparity and information on a horizontal disparity of the object that may be obtained simultaneously, so that an accuracy of the navigation is effectively improved.

In the above embodiments, the principle of the present disclosure has been described. However, a person skilled in the art may understand that, in the present disclosure, all or any one of steps or components of the methods and the devices may be embodied as a hardware, a firmware, a software or a combination thereof in any computing device including a processor, a storage medium and etc., or in any network of computing devices, which may be implemented by a person skilled in the art with basic programming skills based on the present disclosure.

Thus, the principle of the present disclosure may be implemented by running a program or a set of programs on any computing device. The computing device may be a conventional and general-purpose equipment. Therefore, alternatively, the principle of the present disclosure may be implemented by providing a program product including the programs for implementing the methods or the devices. In other words, both the above program product and the storage medium storing the above program product constitutes a portion of the present disclosure. Obviously, such storage medium may be any storage medium that is known in the art or will be developed in the future.

The present disclosure further provides in some embodiments a storage medium such as a Read-Only Memory (ROM), a Random-Access Memory (RAM), a hard disc or a removable storage, and a computer program for allocating resources is stored in the storage medium. The computer programs includes code snippets for executing steps of: obtaining a plurality of ambient sub-images for a collected ambient image based on the collected ambient image; performing a region-matching process on each of the ambient sub-images to determine a disparity between at least two of the ambient sub-images; and determining coordinates of an object in the ambient image based on the determined disparity, and performing a navigation based on the determined coordinates.

The present disclosure further provides in some embodiments a computer program including code snippets for executing following steps to allocate the resources: obtaining a plurality of ambient sub-images for a collected ambient image based on the collected ambient image; performing a region-matching process on each of the ambient sub-images to determine a disparity between at least two of the ambient sub-images; and determining coordinates of an object in the ambient image based on the determined disparity, and performing a navigation based on the determined coordinates.

Figure 9:
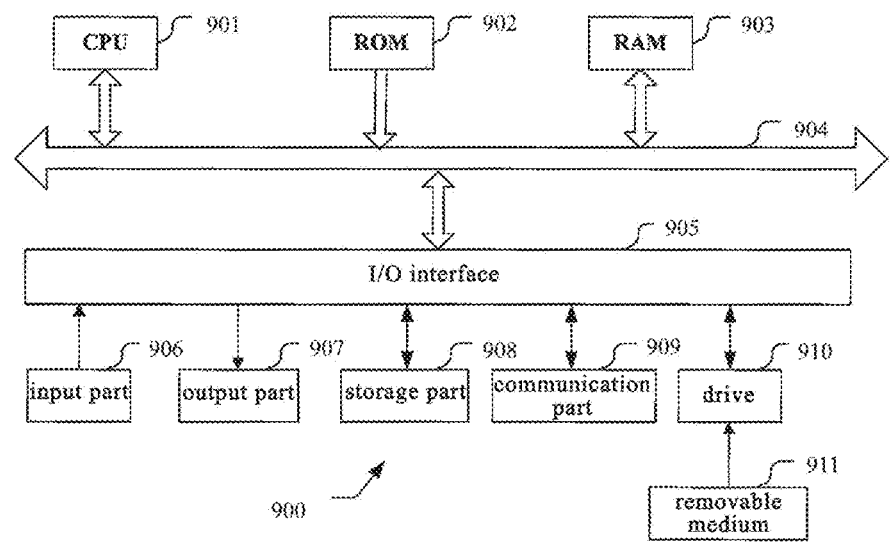
FIG. 9 is a block diagram of a computer according to an embodiment of the present disclosure.

In the case that the embodiments of the present disclosure is implemented by the software and/or the firmware, the program of the software is installed on the computer including particular hardware (e.g., the general-purpose computer as shown in FIG. 9) from the storage medium or the network. Such computer may implement various functions when corresponding programs are installed thereon.

As shown in FIG. 9, a Central Processing Unit (CPU) 901 may execute various processes according to the programs stored in the ROM 902 or the programs loaded to the RAM 903 from the storage 908. The RAM 903 may further store data required by the CPU 901 for, e.g. executing various processes if necessary. The CPU 901, ROM 902 and the RAM 903 are connected to each other via a bus 904. An Input/Output (I/O) interface 905 is also connected to the bus 904.

In particular, the CPU 901 is configured for: obtaining a plurality of ambient sub-images for a collected ambient image based on the collected ambient image; performing a region-matching process on each of the ambient sub-images to determine a disparity between at least two of the ambient sub-images; and determining coordinates of an object in the ambient image based on the determined disparity, and performing a navigation based on the determined coordinates.

The ambient image is collected by the single camera including the primary lens where the micro-lens array is arranged.

The CPU 901 is further configured for pre-processing each of the ambient sub-images to eliminate noise signal in the respective ambient sub-images before performing a region-matching process on each of the ambient sub-images.

Alternatively, in the case that the image processing module pre-processes each of the ambient sub-images to eliminate noise signal in the respective ambient sub-images, the CPU 901 may perform a space-domain-based denoising process on the ambient sub-images and/or a frequency-domain-based denoising process on the ambient sub-images.

Alternatively, the at least two of the ambient sub-images include ambient sub-images collected by at least two neighboring micro-lenses included in the micro-lens array.

Alternatively, the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction.

Alternatively, the region-matching process includes a cost matching computation and/or a cost matching aggregation.

The following components that are connected to the I/O interface 905 may include: an input part 906 including a keyboard, a mouse and etc.; an output part 907 including a display such as a Cathode Ray Tube (CRT) display, a Liquid Crystal Display (LCD) and a speaker; a storage part 908 including a hard disc and etc.; and a communication part 909 including a network interface card such as a Local Area Network (LAN) card and a modem. The communication part 909 performs communication process via the network such as the Internet.

A drive 910 may be also connected to the I/O interface 905 if necessary. A removable medium 911 such as a magnetic disc, an optical disc and a magneto-optical disc or a semiconductor storage may be loaded into the drive 910 if necessary, so that the drive 910 may read the computer program from the removable medium 911 and load the computer program into the storage part 908 if necessary.

In the case that the above processes are implemented by the software, the program of the software is installed from the network such as the Internet or the storage medium such as the removable medium 911.

A person skilled in the art may understand that such storage medium is not limited to the removable medium 911 which stores programs and is arranged separately from the device to provide user with the programs. The removable medium 911 may include the magnetic disc including a floppy disc (registered trademark), the optical disc including a Compact disc (CD)-ROM and a Digital Versatile disc (DVD), the magneto-optical disc including Mini-Disc (MD, registered trademark), the semiconductor storage and etc. Alternatively, the storage medium may be the ROM 902, the hard disc included in the storage part 908 or etc. The programs are stored in the storage medium and distributed to the user along with the device including the programs.

It should be noted that, in the devices and methods of the present disclosure, the components and steps may be divided and/or recombined. Such division and recombination also fall within the scope of the present disclosure. In addition, the above steps may be executed in sequence. However, the present disclosure is not limited thereto. Some of the steps may be executed simultaneously or may be executed independently from each other.

It should be noted that, although the present disclosure and its advantages have been described in details, many substitutions, improvements and modifications may be made without departing from the principle and the spirit of the present disclosure defined in the attached claims. Furthermore, the term "include", "comprise" or a variation thereof intends to cover the meaning of including in a non-exclusive manner, so that a procedure, a method, an object or a device including a plurality of elements may further include other elements that are not explicitly listed, or further include elements that are intrinsic to the procedure, the method, the object or the device. Unless otherwise defined, the element defined by the clause "including a(an) . . . " does not preclude a possibility that the procedure, the method, the object or the device including the element further includes other identical elements.

What is claimed is:

1. A visual navigation method, comprising steps of:
   obtaining a plurality of ambient sub-images for a collected ambient image based on the collected ambient image;
   performing a region-matching process on each of the ambient sub-images to determine a disparity between at least two of the ambient sub-images; and
   determining coordinates of an object in the ambient image based on the determined disparity, and performing a navigation based on the determined coordinates,
   wherein the step of obtaining a plurality of ambient sub-images for a collected ambient image based on the collected ambient image comprises steps of:
   collecting the ambient image by a single camera, and obtaining the plurality of ambient sub-images by a micro-lens array included in a primary lens of the camera,
   wherein the at least two of the ambient sub-images include ambient sub-images collected by at least two neighboring micro-lenses included in the micro-lens array,
   wherein the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction,
   wherein the step of performing a region-matching process on each of the ambient sub-images to determine a disparity between at least two of the ambient sub-images comprises steps of:
   calculating a matching cost for a horizontal sub-image and another matching cost for a vertical sub-image respectively, performing a matching cost aggregation process and a matching cost computation process for these matching costs, so as to obtain a horizontal disparity and a vertical disparity, and obtaining a final disparity by averaging the horizontal disparity and the vertical disparity.

2. The method according to claim 1, wherein before the step of performing a region-matching process on each of the ambient sub-images, the method further comprises a step of:
   pre-processing each of the ambient sub-images to eliminate noise signal in the respective ambient sub-images.

3. The method according to claim 2, wherein the step of pre-processing each of the ambient sub-images comprising steps of:
   performing a space-domain-based denoising process on the ambient sub-images and/or performing a frequency-domain-based denoising process on the ambient sub-images.

4. A visual navigation device, comprising:
   an image collection circuit that obtains a plurality of ambient sub-images for a collected ambient image based on the collected ambient image;
   a disparity determination circuit that determines a disparity between at least two of the ambient sub-images by performing a region-matching process on each of the ambient sub-images; and a visual navigation circuit that determines coordinates of an object in the ambient image based on the determined disparity, and performs a navigation based on the determined coordinates, wherein the image collection circuit collects the ambient image by a single camera, and obtains the plurality of ambient sub-images by a micro-lens array included in a primary lens of the camera, wherein the at least two of the ambient sub-images include ambient sub-images collected by at least two neighboring micro-lenses included in the micro-lens array, wherein the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction, wherein the disparity determination circuit calculates a matching cost for a horizontal sub-image and another matching cost for a vertical sub-image respectively, performs a matching cost aggregation process and a matching cost computation process for these matching costs, so as to obtain a horizontal disparity and a vertical disparity, and obtains a final disparity by averaging the horizontal disparity and the vertical disparity.

5. The device according to claim 4, further comprising:
an image processing circuit that pre-processes each of the ambient sub-images to eliminate noise signal in the respective ambient sub-images before performing a region-matching process on each of the ambient sub-images.

6. The device according to claim 5, wherein in the case that the image processing circuit pre-processes each of the ambient sub-images to eliminate noise signal in the respective ambient sub-image, the image processing circuit performs a space-domain-based denoising process on the ambient sub-images and/or a frequency-domain-based denoising process on the ambient sub-images.

7. A robot comprising a visual navigation device,
wherein the visual navigation device comprises:
an image collection circuit that obtains a plurality of ambient sub-images for a collected ambient image based on the collected ambient image;

a disparity determination circuit that determines a disparity between at least two of the ambient sub-images by performing a region-matching process on each of the ambient sub-images; and a visual navigation circuit that determines coordinates of an object in the ambient image based on the determined disparity, and performs a navigation based on the determined coordinates, wherein the image collection circuit collects the ambient image by a single camera, and obtains the plurality of ambient sub-images by a micro-lens array included in a primary lens of the camera, wherein the at least two of the ambient sub-images include ambient sub-images collected by at least two neighboring micro-lenses included in the micro-lens array, wherein the ambient sub-images collected by the at least two neighboring micro-lenses include ambient sub-images collected by at least two neighboring micro-lenses in a horizontal direction and/or ambient sub-images collected by at least two neighboring micro-lenses in a vertical direction, wherein the disparity determination circuit calculates a matching cost for a horizontal sub-image and another matching cost for a vertical sub-image respectively, performs a matching cost aggregation process and a matching cost computation process for these matching costs, so as to obtain a horizontal disparity and a vertical disparity, and obtains a final disparity by averaging the horizontal disparity and the vertical disparity.

8. The robot according to claim 7, wherein the visual navigation device further comprises:
an image processing circuit that pre-processes each of the ambient sub-images to eliminate noise signal in the respective ambient sub-images before performing a region-matching process on each of the ambient sub-images.

9. The robot according to claim 8, wherein in the case that the image processing circuit pre-processes each of the ambient sub-images to eliminate noise signal in the respective ambient sub-image, the image processing circuit performs a space-domain-based denoising process on the ambient sub-images and/or a frequency-domain-based denoising process on the ambient sub-images.

\* \* \* \* \*